United States Patent
Cavey

[15] 3,656,095
[45] Apr. 11, 1972

[54] TERRAIN AVOIDANCE SYSTEM FOR A TOWED UNDERWATER VEHICLE

[72] Inventor: Richard R. Cavey, Ellicott City, Md.
[73] Assignee: The United States of America as represented by the Secretary of the Navy
[22] Filed: Aug. 25, 1970
[21] Appl. No.: 66,721

[52] U.S. Cl. ............................. 340/3 R, 114/235 B, 340/3 T
[51] Int. Cl. ............................................ G01s 9/68
[58] Field of Search ............... 114/235 R, 235 B; 340/3 R, 340/3 T

[56] References Cited

UNITED STATES PATENTS 3,351,895  11/1967  Cupp et al. ............................. 340/3 R Primary Examiner—Richard A. Farley
Attorney—Richard S. Sciascia, Louis B. Applebaum and Ernest F. Weinberger

[57] ABSTRACT

A terrain avoidance system to provide a towed underwater vehicle with the ability to avoid those terrain features which constitute a danger, yet permit the vehicle to navigate and search irregular terrain. This capability is provided employing the information obtained by an obstacle detection sonar subsystem; sonar information is so processed that the altitude control winch system for the vehicle is overridden when a terrain feature is classified as a potentially dangerous obstacle.

7 Claims, 8 Drawing Figures

United States Patent
Cavey
[15] 3,656,095
[45] Apr. 11, 1972
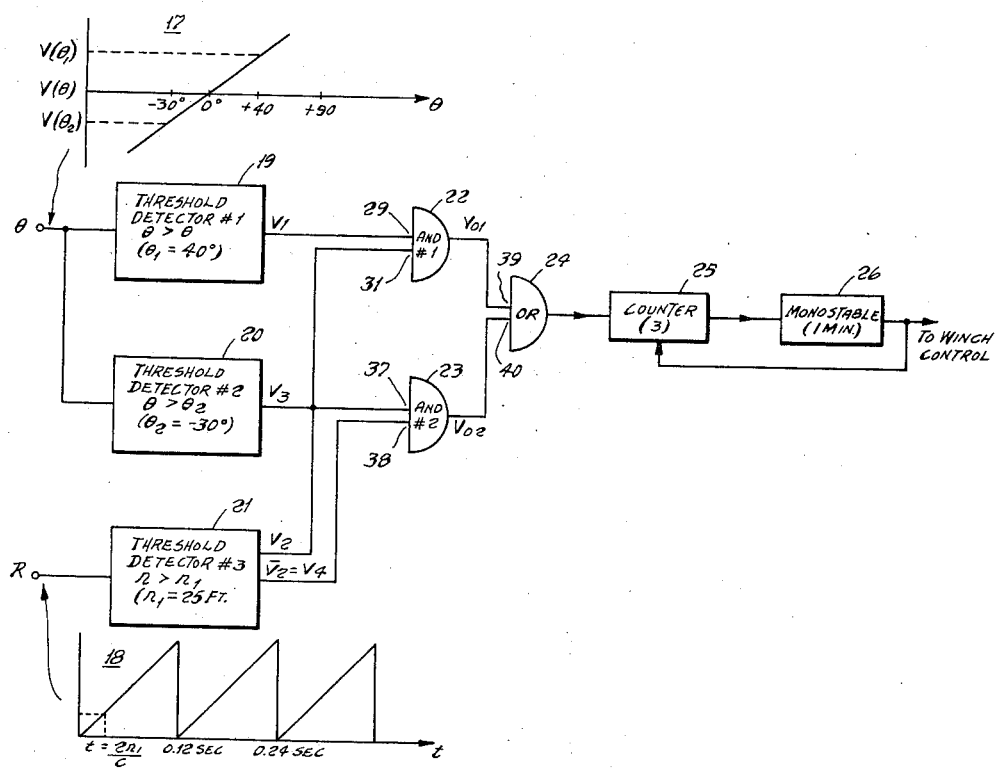

INVENTOR.
RICHARD R. CAVEY
BY Ernest J Weinberger
ATTORNEYS

3,656,095

TERRAIN AVOIDANCE SYSTEM FOR A TOWED UNDERWATER VEHICLE

The invention described herein may be manufactured and used by or for the Government of the United States of America for governmental purposes without the payment of any royalties thereon or therefor.

BACKGROUND OF THE INVENTION

1. Field of the Invention

The present invention relates to underwater towed vehicles and more particularly to guidance systems for altitude control of such vehicles when being towed in conjunction with a controllable winch system, to be automatically maneuverable to avoid hazardous terrain features.

2. Description of the Prior Art

In the field of underwater towed vehicles it has been the general practice to employ pulsed sonar, which insonifies an area directly in the path of the vehicle. Thus, an obstacle in its path could be detected and a winch command initiated. This situation, where a gradual slope is encountered, would generate an unnecessary winch command since the slope yields a sonar return. In another technique, the terrain features are displayed for an operator who is continually monitoring the display and who initiates the winch-up command. It has been found to be undesirable to rely on the operator's judgement, which itself is dependent on his alertness and experience. The present invention overcomes these difficulties.

SUMMARY OF THE INVENTION

The general purpose of this invention is to provide an automatic terrain avoidance system for a towed underwater vehicle that has all the advantages of similarly employed prior art devices and has none of the above described disadvantages. To attain this, the present invention derives altitude and depression angles as well as range information from a sonar system. These three bits of information are continually generated and applied to threshold detectors and then in combination to a pair of AND gates of a logic circuit. The AND outputs are fed into an OR circuit whose output is applied to the series combination of a counter and monostable flip-flop connected in feed-back to the counter. The winch control signal is derived from the flip-flop output. By selectively adjusting the threshold detectors, critical angles of altitude and depression, and the range, can be set so that the vehicle will avoid dangerous obstacles without prohibiting the climbing of gradual slopes.

An object of the present invention is to provide a simple, direct inexpensive terrain avoidance system for a towed underwater vehicle which employs only the information derived from existing sonar equipment.

Another object is to provide an underwater guidance system which permits a towed vehicle to avoid obstacles and still climb gradual slopes.

Still another object is to provide an underwater guidance system wherein the angular and range parameters may be selectively adjusted.

Other objects and many of the attendance advantages of this invention will be readily appreciated as the same becomes better understood by reference to the following detailed description when considered in connection with the accompanying drawings.

DESCRIPTION OF THE PREFERRED EMBODIMENT

A terrain avoidance system must have the capability of recognizing the existence of an object which lies directly in front of the towed vehicle and initiating corrective action to avoid collision. This implies the avoidance of reasonable obstacles without impeding the capability of slope climbing. The upper limit of slope climbing is established by the winch rise rate for a given speed. The vertical winching rate and the vehicle forward velocity determine the vehicle path during winch-up. Considering a typical vehicle with a vertical winch lift velocity of 4 feet/sec and a forward speed of 1.5 knots (2.5 feet/sec), the maximum slope is approximately 58°. Thus, to normally avoid steeper slopes, the climb must be initiated early enough. In order to include some safety factor, corrective action should be commenced for some slope less than 50° or the maximum winching capability, as for example 40°. Anomalies that are encountered can be avoided by allowing the vehicle to approach the obstacle only up to the point where the critical elevation angle (40°) between the longitudinal vehicle body axis and the top of the obstacle is detected.

Figure 1:
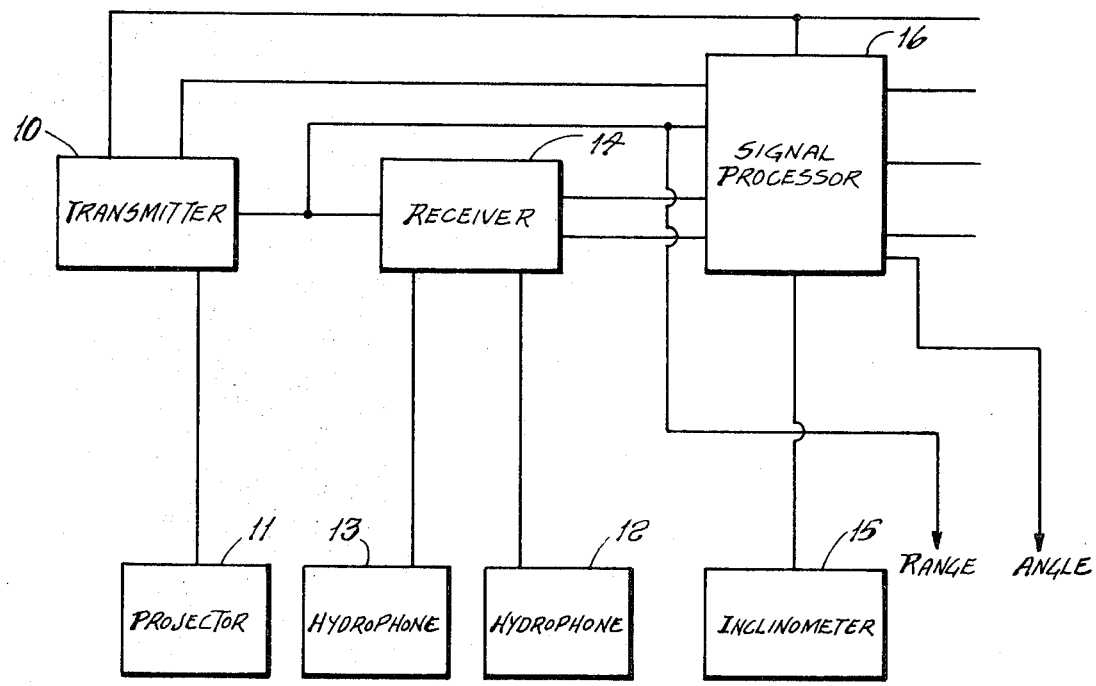
FIG. 1 is a block diagram of a Vertical Obstacle Sonar used in conjunction with the present invention.

FIG. 1 indicates the basic components of a typical vertical obstacle sonar mounted in the vehicle wherein the transmitter 10 is operated in the pulsed mode and applied its output to the projector 11 to insonify a fan shaped region in front of the towed vehicle, which region is narrow in the horizontal plane and wide in the vertical. The reflected signals from within this volume are received by two hydrophones 12 and 13 which have beam patterns and are oriented identically to the projector 11. Their acoustic centers are located in close proximity to each other. The range of the detected obstacle is determined by the elapsed time between reception and transmission and the angular direction ($\theta$) thereof in the vertical plane is determined by the relative phase between the signals received by the two hydrophones and fed into the receiver 14. The inclinometer 15 furnishes a signal to the processor 16, indicating the inclination of the sonar beam axis of symmetry with respect to the horizon. The system provides a range output which is a ramp voltage corresponding to the range as a voltage signal. Since the transducers are closely spaced, they act essentially as an interferometer in that the relative direction of propagation of an acoustic wavefront determines the electrical phase angle between the processed return signals. A phase detector is employed to generate a voltage proportional to the averaged phase angle between the two signals. This signal is summed with the inclinometer signal and an adjustable bias to generate a voltage proportional to the acoustic source angle ($\theta$).

Figure 2:
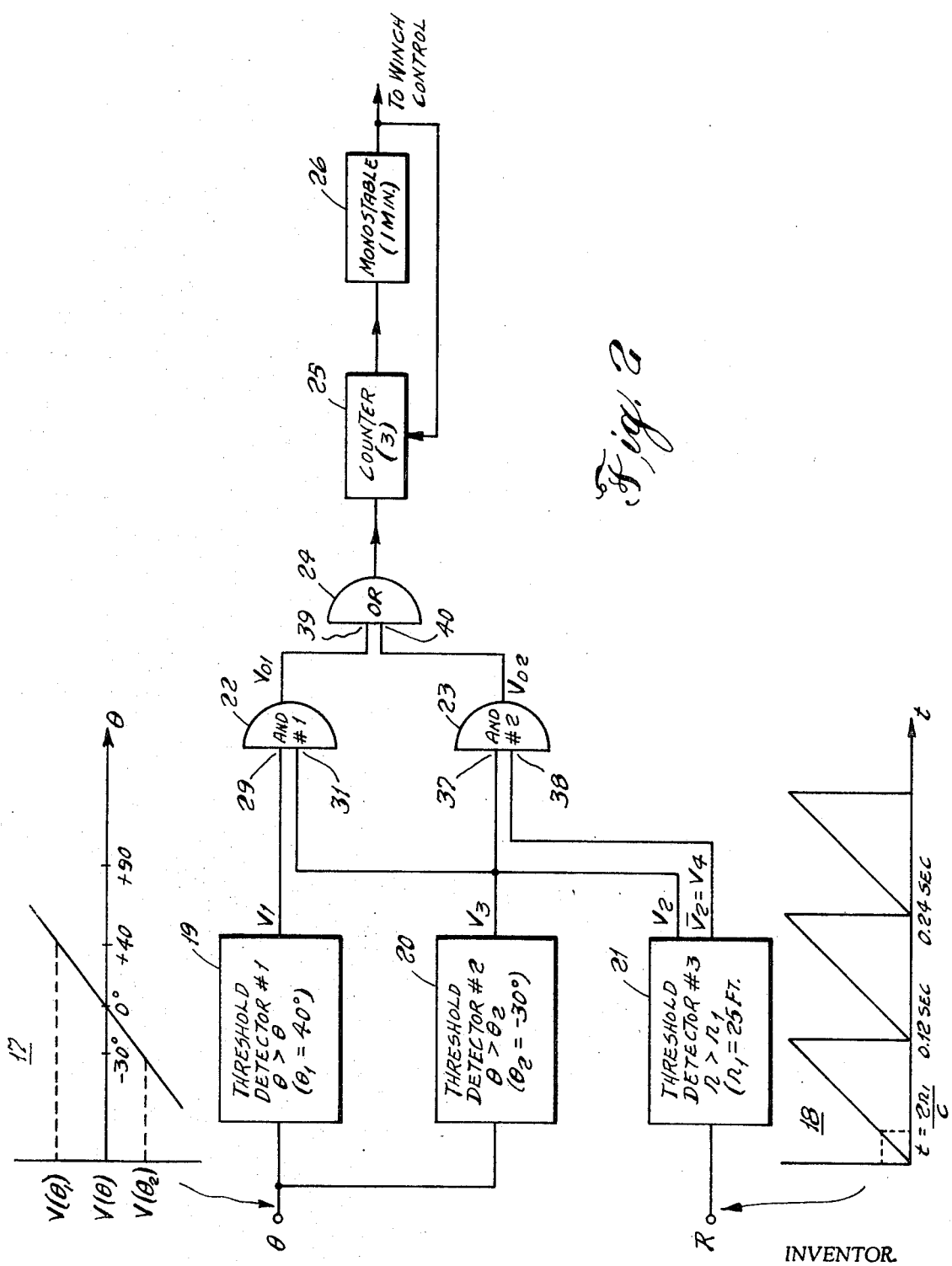
FIG. 2 is the logic control circuit made in accordance with the principles of the invention.

These outputs, namely range and vertical angle, are applied to a logic circuit shown in FIG. 2. The voltage $V(\theta)$ proportional to the vertical angle is shown at 17 and the corresponding horizontal range voltage ($V_r$) at 18. The vertical angle signal $V(\theta)$ is simultaneously applied to the input of two threshold detectors 19 and 20. Detector 19 is adjusted to provide an output voltage only when the input voltage ($V(\theta_1)$ exceeds that of the critical angle (40°), while detector 20 only provides an output $V(\theta_2)$ when the angle ($\theta$) is more than 30° depression. All three threshold detectors, including range input detector 21, can be Schmitt Trigger circuits, except that the range detector has a pair of outputs "1" and "0" which are reversed when the threshold is exceeded. The outputs of the wo angle detectors 19, 20 are connected to one each of the inputs of AND circuits 22 and 23, while the two outputs of the range detector are connected to the other inputs of the AND gate circuits. The outputs of the AND gates are applied to the two inputs of the OR gate 24, whose output in turn is fed into one input of the counter 25. The counter output is applied to a monostable flip-flop 26 which also provides a feed-back to the counter. Thus it is clear that if a predetermined number of pulses, for example 3, are applied to the counter, then the monostable will be fired. The counter is employed to reduce the probability of a false command since three sonar transmissions yielding the same angle information $V(\theta)$ are required before a winch-up command is initiated. The monostable can be set to hold the winch-up command for a long period of time in order to guarantee that the vehicle has cleared the obstacle before the normal mode of towing (using the altitude sensor to control winching) is resumed.

Figure 3:
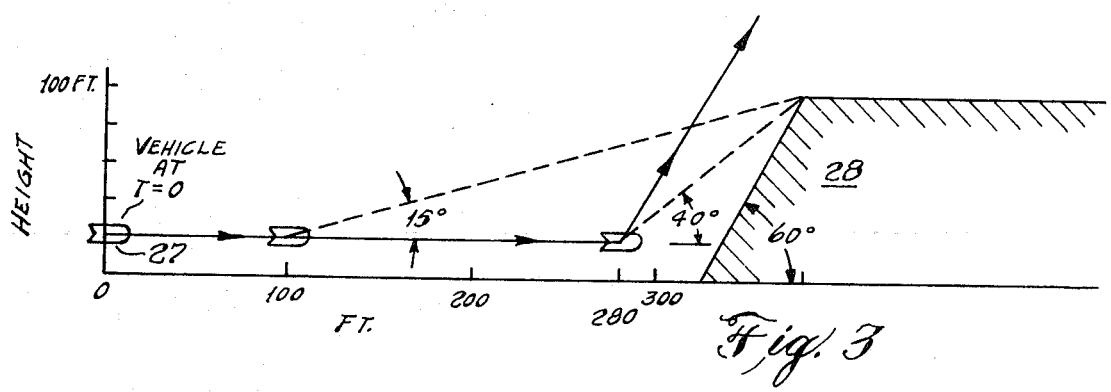
FIG. 3 indicates the position of the vehicle at various distances from the obstacle.
Figure 4:
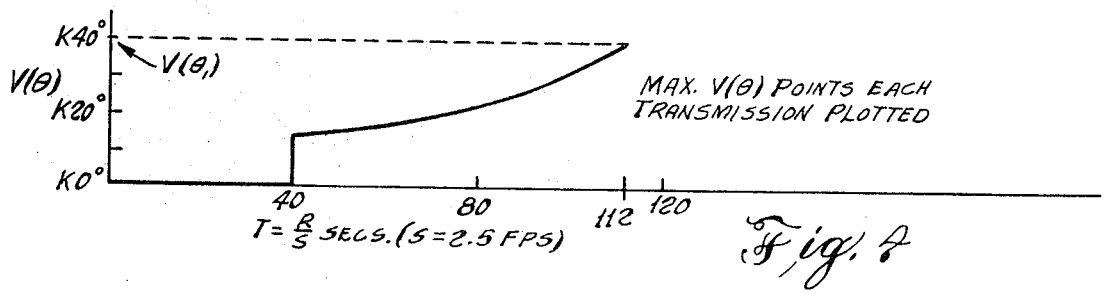
FIG. 4 is a plot of distance vs elevation angle (voltage) for the angular output at various vehicle distances.
Figure 5:
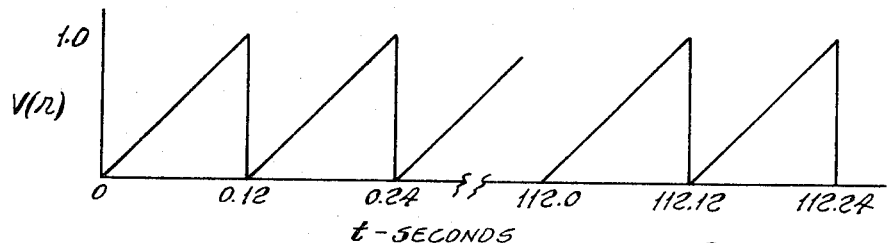
FIG. 5 is a plot of the range ramp voltage vs time or distance.
Figure 6:
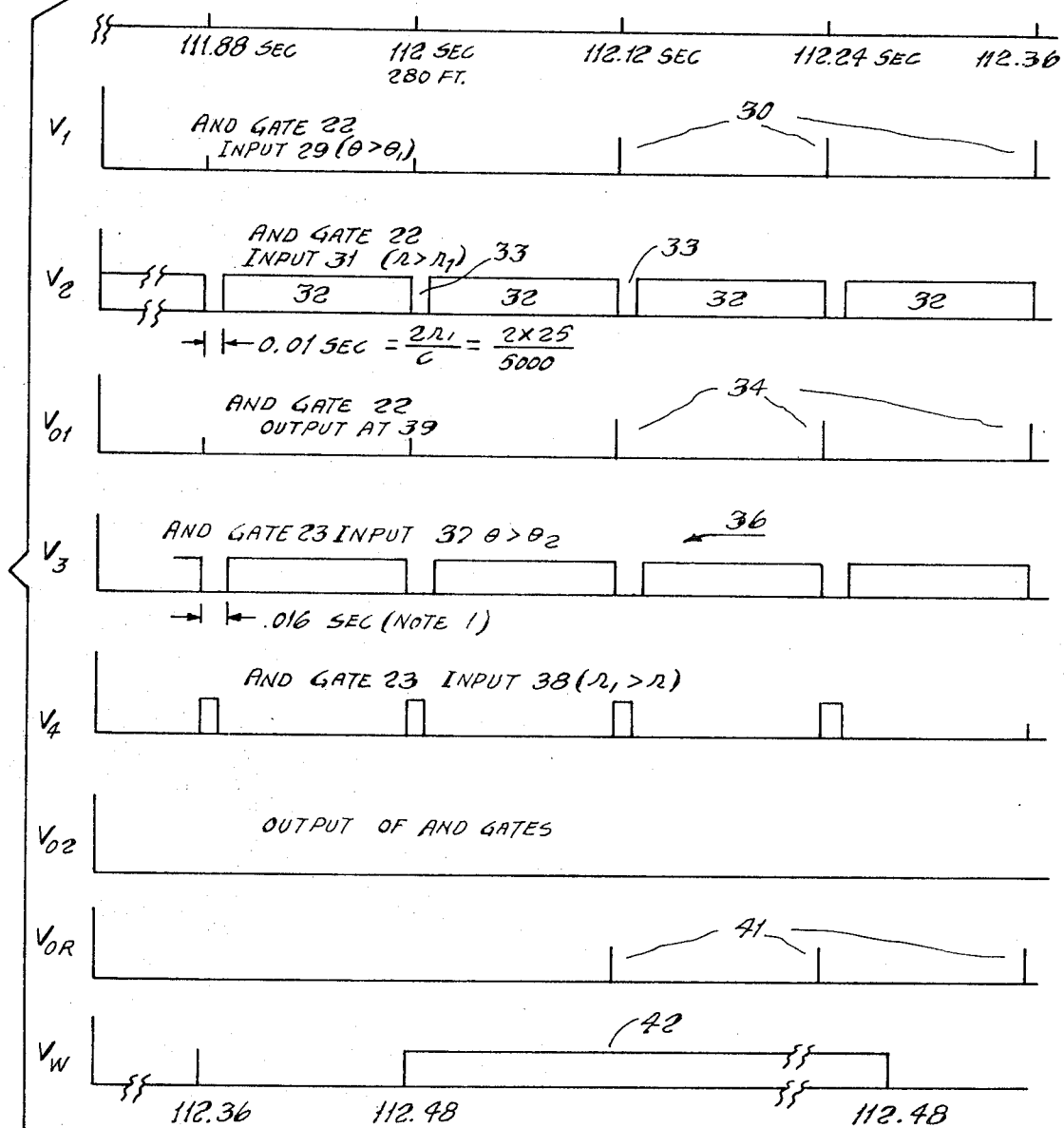
FIG. 6 is a plot of the various voltages vs time of the circuit outputs.

Consider now physical conditions illustrated in FIG. 3, where the vehicle is being towed at some depth, for example 20 feet from the bottom, at a speed of 2.5 feet/sec with a maximum winch-up vertical velocity of 4 ft/sec. The sonar range maximum is set for 300 feet (PRF=120 msec) and a critical angle setting of 40°. The vehicle 27 is proceeding toward the right from time zero and, at the 100 ft point, the sonar will receive a return from the obstacle 28 and the threshold detector will receive a voltage $V(\theta_{15})$ as indicated on FIG. 4 (at 40 seconds) equivalent to 15°. This graph is shown with a time scale which greatly exceeds the round trip transmission — receive time of the sonar, and is the result of plotting the peak signal received during each transmission — receive time. The peak signal $V(\theta_1)$ corresponds to the top of the object, and is zero until the vehicle is within the sonar range of the target. At the 100 ft point, which occurs 40 seconds after $T=o$, the angle formed with the top of the object is 15°. After the vehicle has traversed 280 ft from zero, the voltage $V(\theta)$ will be greater than $V\theta_1$) = $V(40°)$ and therefore a "1" will be present at input 29 of AND gate 22 at the end of the scan. This will be repeated every complete cycle of sonar scan (0.12 seconds) as shown at 30 of FIG. 6. At input 31 of AND gate 23, a "1" will be present during that part of the transmission-receive period 32 (see FIG. 6) when the range of the target exceeds $r_1$ (25 feet). Where the range setting is less than 25 feet as at 33, the output is a "0" for all times except when both inputs are "1," as at 34 (when the angle $\theta$ is greater than 40° and for each sweep).

The output from threshold detector 20 is "1" 35 as long as $\theta$ is greater than −30°, the angle of depression and the range is greater than 40 feet (see 35). The range is less than 40 feet for a duration of 0.016 sec during each scan sweep. This output is applied to input 37 of AND gate 23 while the other input 38 receives the inverse output of range threshold detector 21, which is "0" except when the range is less than 25 feet. Since under these conditions of FIG. 3 neither the output of threshold detector 20 nor the inverse output of detector 21 provide simulataneous "1"'s, the output of AND gate 23 will always be "0." The outputs of AND gates 22 and 23 are applied to inputs 39 and 40 of OR gate 24, whose output "1" (41) exists only when either input is "1." This series of pulses 41 are applied to the counter 25, which does not apply any output until after 3 consecutive pulses to the monostable so that the monostable applies a winch command 42 for 1 minute thereafter.

Figure 7:
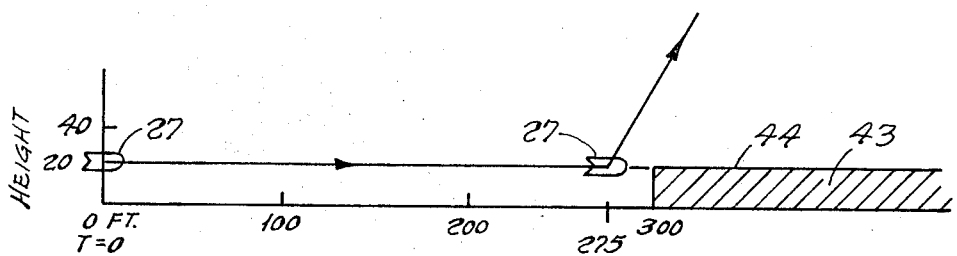
FIG. 7 indicates the positions of the vehicle with respect to a level obstacle.
Figure 8:
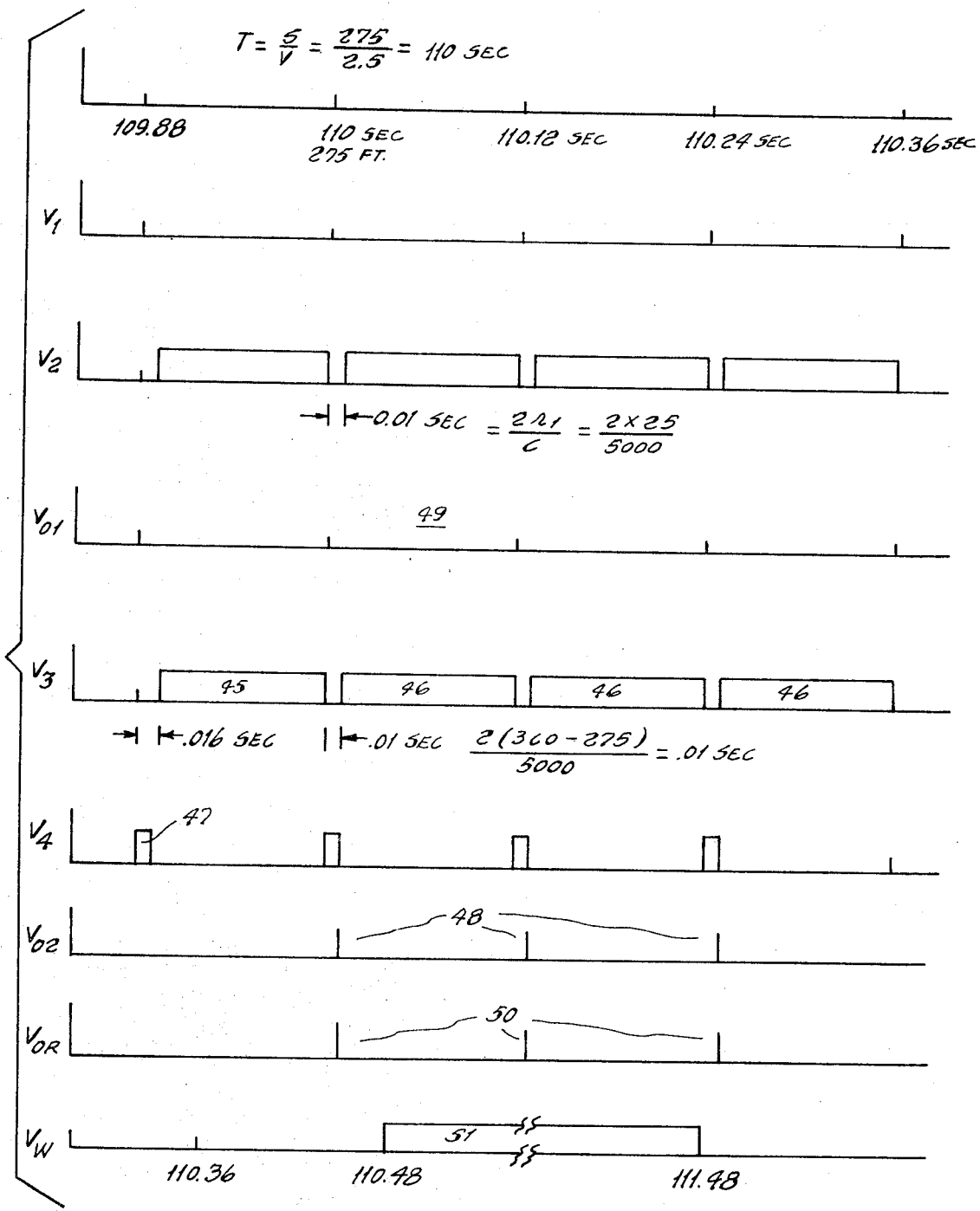
FIG. 8 is a plot of various voltages vs time for the sequence of FIG. 7.

Considering now the physical parameters as shown in FIG. 7, the vehicle 27 is proceeding toward an obstacle 43 whose uppermost surface 44 is level with the vehicle or at the same height above the bottom. Under these conditions, the output of threshold detector 19 will remain a "0" for the entire vehicle transit while a "1" will be present at threshold detector 20 and AND gate 23 input 37, while the vehicle is more than 25 feet from the obstacle from a time of 0.016 seconds after the start of the transmission — receive period to the end of the period (see 45 of FIG. 8). This signal is the result of the bottom return, which exceeds −30° threshold.

The slant range to the bottom will be 40 ft when the vehicle is towed at 20 feet. Upon closing to within 25 ft of the obstacle, the "1" condition 46 will exist at 0.01 seconds (corresponding to 25 ft slant range) after the start of the transmission-receive period to the end thereof. The inverted output $V_4$ of threshold detector 21 at input 38 of AND gate 23, for range in excess of 25 feet, will be a "1" (47) for a period of 0.01 seconds from the period start. Therefore the output of AND gate 23 will remain at "0" during each transmit-receive period when the vehicle is further than 25 ft from the obstacle and will be a "1" at 0.01 seconds after the start of the period (48) while AND gate 22 output (49) remains "0" throughout. The OR gate 24 output (50) therefore is a "1" in coincidence with the output of AND gate 23 and the time (0.36 seconds) required to receive the necessary three pulses (50) to initiate a winch-up command is negligible when considering the rate of vehicle advance (0.9 ft in this time). Under these circumstances, the input pulses to the counter and winch-up command (51) will be initiated when the vehicle is within 25 ft of the obstacle.

Obviously many modifications and variations of the present invention are possible in the light of the above teachings. It is therefore to be understood that within the scope of the appended claims the invention may be practiced otherwise than as specifically described.

I claim:

1. An underwater terrain avoidance apparatus for a towed vehicle suspended from a winch and having included therein a pulsed vertical obstacle sonar system which provides a voltage proportional to target range and a voltage proportional to target deflection angle, which apparatus comprises first and second threshold detectors each having an input and an output and providing an output only when the input voltage thereto exceeds a selected value for that detector, a third threshold detector having an input terminal and a pair of output terminals and providing one output at one of said pair of output terminals only when the input voltage thereto exceeds a selected value and an output at the other of said pair of terminals only when said input is less than said selected value, a first and second AND gate having a pair of input terminals and one output terminal, said first AND gate being connected to receive at its inputs said one output terminal of said third detector and said output of said first detector, said second AND gate being connected to receive at its inputs said other output terminal of said third detector and said output of said second detector, an OR gate having its inputs connected to receive the outputs of said first and second AND gates, a pulse counter for providing an output only after a selected number of signal input pulses including a reset input and having its input connected to receive the output of said OR gate, and a monostable oscillator for providing an output signal for a selected time period, having its input connected to the output of said counter and having an output signal connected to said reset input of said counter, whereby when said target deflection angle voltage is applied to said inputs of said first and second detectors and said range voltage applied to said input of said third detector and said monostable output signal connected to activate said winch for raising said towed vehicle, said vehicle will automatically avoid underwater obstacles.

2. The apparatus according to claim 1 wherein said threshold detectors are Schmitt trigger circuits.

3. The apparatus according to claim 2 wherein said selected value of said first detector corresponds to an elevation angle of 40° for a towing speed of 2.5 feet/second.

4. The apparatus according to claim 3 wherein said selected value of said second detector corresponds to a depression angle of 30°.

5. The apparatus according to claim 4 wherein said selected value of said third detector corresponds to a range of 25 feet.

6. The apparatus according to claim 5 wherein said selected number of signal input pulses is three.

7. The apparatus according to claim 6 wherein said selected time period is approximately 1 minute.